United States Patent [19]
Maute et al.

[11] Patent Number: 5,169,094
[45] Date of Patent: Dec. 8, 1992

[54] GEOSTATIONARY EARTH OBSERVATION SATELLITE INCORPORATING LIQUID PROPELLANT APOGEE MANEUVER SYSTEM AND HOLLOW ANTENNAS

[75] Inventors: Patrick Maute, Valbonne; Alain Reboux, Fayence; Bertrand Huet, Vence, all of France

[73] Assignee: Aerospatiale Societe Nationale Industrielle, Paris, France

[21] Appl. No.: 659,006

[22] Filed: Feb. 21, 1991

[30] Foreign Application Priority Data

Feb. 26, 1990 [FR] France ............... 90 02367
Oct. 2, 1990 [FR] France ............... 90 12126

[51] Int. Cl.[5] .................... B64G 1/22; B64G 1/26
[52] U.S. Cl. .................... 244/158 R; 244/169; 343/DIG. 2
[58] Field of Search .......... 364/434; 244/158 R, 244/161, 165, 168, 169; 343/915, DIG. 2, 893, 797, 720, 911 R

[56] References Cited

U.S. PATENT DOCUMENTS

| | | | |
|---|---|---|---|
| 3,426,351 | 2/1969 | Hai et al. | 343/797 |
| 3,638,882 | 2/1972 | Turriere | 244/158 |
| 3,758,051 | 9/1973 | Williams | 244/173 |
| 3,817,481 | 6/1974 | Berks et al. | 244/173 |
| 4,288,051 | 9/1981 | Göschel | 244/165 |
| 4,305,555 | 12/1981 | Davis | 244/173 |
| 4,343,005 | 8/1982 | Han et al. | 343/DIG. 2 |
| 4,753,506 | 6/1988 | Einhorn et al. | 244/165 |

FOREIGN PATENT DOCUMENTS

1156891 7/1969 United Kingdom .

OTHER PUBLICATIONS

Burr et al., "The Synchronous Meterological Satellite (SMS) System", NASA/GSFC, Dec. 1972.
Dietrich, "An Amplitude-Steered, Electronically Despun Antenna for the Synchronous Meterological Satellite", Dec. 1972.

*Primary Examiner*—Joseph F. Peters, Jr.
*Assistant Examiner*—Virna Lissi Ansley
*Attorney, Agent, or Firm*—Remy J. VanOphem

[57] ABSTRACT

A satellite adapted to be spin-stabilized in geostationary orbit having, coaxial with a spin rotation axis, a satellite surrounded with a solar generator. At least two equipments including an apogee maneuver system are disposed along the rotation axis. A set of generally annular antennas including at least one picture transmission antenna is disposed on one of the NORTH and SOUTH faces of the satellite so as to leave at its center a cylindrical space along the spin rotation axis to house one of the equipments. The other of the equipments is disposed on the other of the NORTH and SOUTH faces.

35 Claims, 10 Drawing Sheets

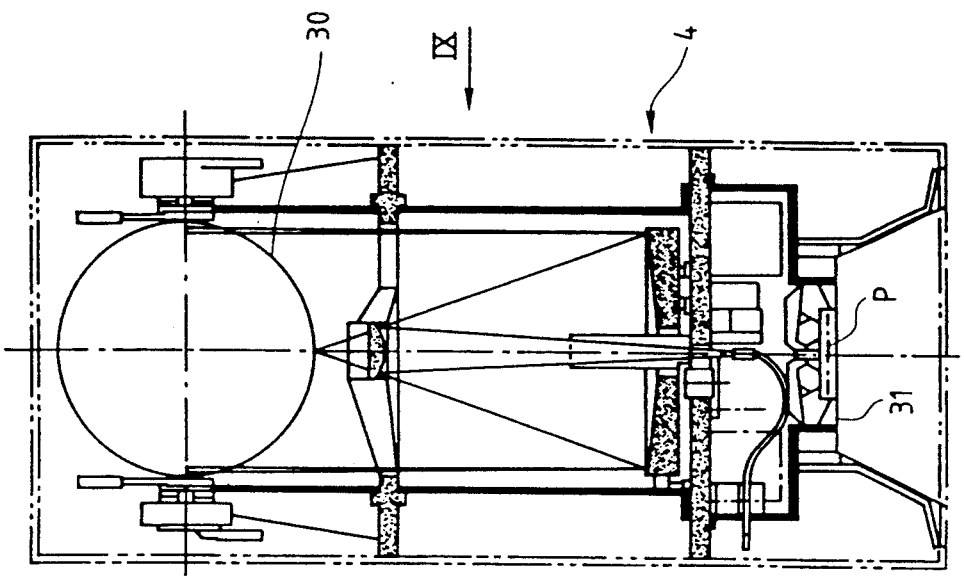
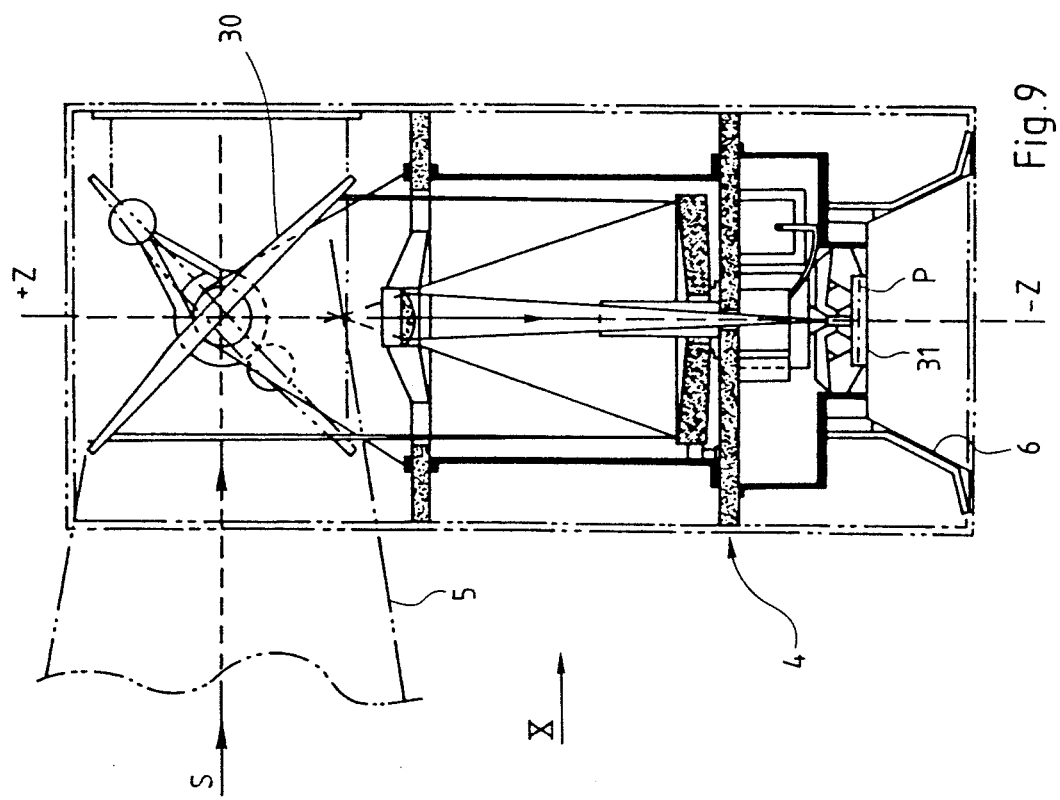

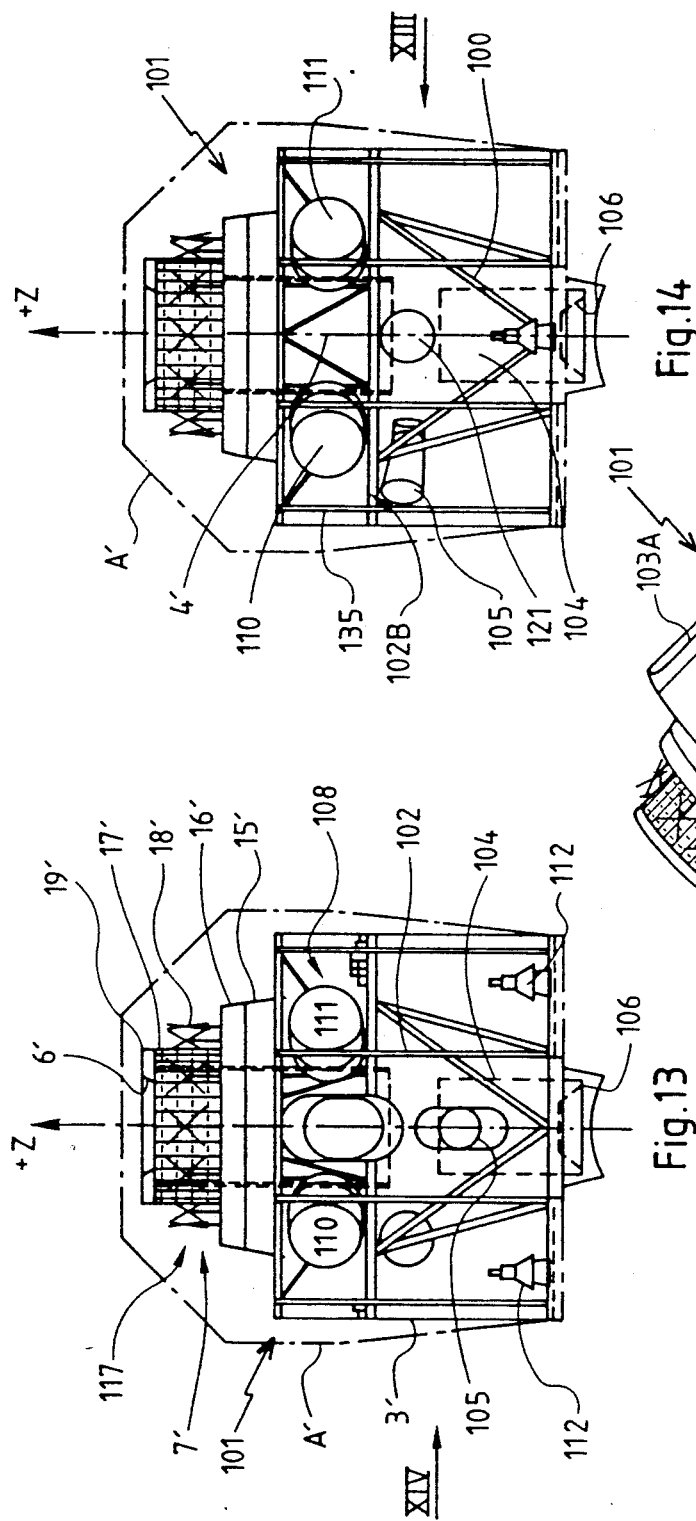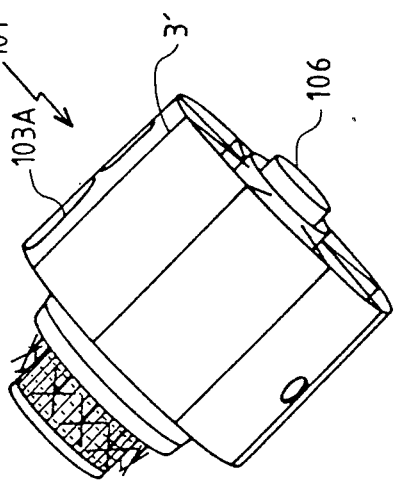

GEOSTATIONARY EARTH OBSERVATION SATELLITE INCORPORATING LIQUID PROPELLANT APOGEE MANEUVER SYSTEM AND HOLLOW ANTENNAS

BACKGROUND OF THE INVENTION

1. Field of the Invention

The present invention concerns the general structure of satellites, for example observation satellites and in particular Earth observation satellites. It is particularly directed to spin-stabilized satellites; it is particularly, but not exclusively, concerned with meteorological satellites.

2. Description of the Prior Art

Spin-stabilized geostationary meteorological satellites have already been used by the Unites States, the Soviet Union, Japan and Europe as part of the WWW (World Weather Watch) meterological observation program. Such satellites include the US GOES 1 and 4 satellites, the European MOP satellite and the Japanese GOIS satellite.

Until now terrestrial observation satellites have always been spin-stablized and have always used solid propellant apogee maneuver systems.

At the present time various projects are in hand, in particular in the United States and Europe, towards launching second generation satellites, so called to distinguish them from existing (or first generation) satellites; these second generation satellites are intended to have significantly better performance than first generation satellites, especially with regard to the number of channels and pointing accuracy; this implies a dry mass much greater than that of first generation satellites (some 800 to 1 500 kg, as compared with approximately 300 to 350 kg previously).

Since the time when the first generation satellites were designed and launched, important changes have occurred in the field of satellite propulsion, applicable to geostationary and other type satellites: the use of solid propellant apogee motors has given way to the use of liquid propellant propulsion systems.

This general adoption of liquid propellants as opposed to solid propellants is explained by their better specific impulse, the possibility of providing a unified propellant system for the apogee maneuver, orbit correction and attitude control systems, increased operational flexibility (the facility to carry out an apogee maneuver in a number of phases) and a more flexible concept (the liquid propellant tanks are filled immediately before launch to the maximum allowable mass of the satellite, whereas previously it would have been necessary to choose the solid propellant motor and its propellant tank at some stage during the development process on the basis of the projected mass of the completed satellite). The use of liquid propellants results in a significant savings of mass at launch.

One consequence of this trend is that there is not available in Europe at this time any flight-qualified solid propellant apogee motor suitable for the masses typical of modern satellites (800 to 1 500 kg dry mass).

Also, the use of liquid propellant apogee thrusters poses a particular and critical problem in the case of observation satellites (especially meteorology satellites) that are spin-stabilized.

The role of observation satellites entails imaging the Earth and/or its atmosphere in the infra-red band. The sensors used for this have to be cooled to low temperatures, in the order of 100K, to achieve acceptable signal/noise characteristics. These low temperatures are conventionally obtained by placing the focal plane of the observation instrument (on which the infra-red sensors are located) under a frustoconical radiator disposed on a transverse face of the satellite facing towards deep space, in order to minimize the flow of energy, especially solar energy, from the exterior and prejudicial to the removal of heat by the radiator. The frustoconical side wall of the radiator is conventionally inclined at an angle slightly greater than 23.5° to a plane transverse to the spin rotation axis and is highly polished (it is usually made from aluminum) to make it highly reflective and to reject outside the radiator any incident solar radiation, even under worst case conditions (in particular, the winter solstice when the radiator is on the SOUTH face of the satellite).

In all first generation satellites the field of view of the passive radiator towards deep space (towards the SOUTH) was achieved by jettisoning the solid propellant apogee motor after the burn; the radiator was situated immediately behind the apogee motor, at the satellite/apogee motor interface. From this point of view the solid propellant apogee motor has the advantage of constituting with its propellant tank a compact and easily jettisoned assembly.

The opposite (NORTH) face of the satellite is occupied by the ground communication antennas which include a telecommunication boom disposed accurately along the spin rotation axis of the satellite.

Jettisoning the apogee maneuver system appears to be out of the question in the case of a liquid propellant system (especially with a unified propellant system), given that the propellant for the apogee burn is fed to the apogee thruster (which is accurately oriented along the spin rotation axis) from storage tanks inside the body of the satellite by means of pipes and that it is not feasible, for reasons connected with sealing, to provide a break between the storage tanks and the apogee thruster to allow the latter to be jettisoned.

Designing spin-stabilized geostationary observation satellites, therefore, requires a solution to be found to the following technical problem: how to install the axially disposed antennas, the axially disposed liquid propellant apogee maneuver system and the axially disposed radiator of the observation system while simultaneously meeting constraints associated with spin rotation of the satellite (in particular, the observation system conventionally includes mobile optical parts which it has seemed essential to keep as close as possible to the spin rotation axis to protect them from excessive centrifugal forces). On a more general level, the problem is to locate on the rotation axis of a spin-stabilized satellite an axial propulsion system and two axial equipments (in this instance an antenna boom and a radiator).

More generally, the problem is to accommodate on a spin-stabilized satellite an axial propulsion system, a set of communication antennas and an equipment which must, like the set of antennas, be disposed along the spin rotation axis.

SUMMARY OF THE INVENTION

The present invention consists in a satellite adapted to be spin-stabilized in geostationary orbit including, coaxial with a spin rotation axis, a satellite body surrounded with a solar generator, at least two equipments including an apogee maneuver system disposed along the axis, and a set of antennas including at least one picture transmission antenna. The set of antennas is generally annular and disposed on one of the NORTH and SOUTH faces of the satellite so as to leave at its center a cylindrical space along the spin rotation axis to house one of the equipments, the other of the equipments being disposed on the other of the NORTH and SOUTH faces.

Preferred embodiments of the invention can incorporate any of the following features or combinations thereof.

The equipment on the same face of the satellite as the set of antennas is an observation system radiator facing towards deep space through the cylindrical space.

The equipment on the same face of the satellite as the set of antennas is as apogee thruster.

The equipment disposed on the opposite face of the satellite is an observation system radiator around which is disposed an axial skirt fastened to the satellite body.

The picture transmission antenna is a biconical toroidal antenna constituting an annular source surrounding the cylindrical space and in the form of a waveguide.

The picture transmission antenna has an asymmetric aperture angle relative to a plane transverse to the spin rotation axis.

The picture transmission antenna operates in a frequency band in the X or Ku band.

The picture transmission antenna is disposed adjacent the NORTH or SOUTH face of the satellite on which the set of antennas is mounted.

The set of antennas is a biconical toroidal data reception antenna constituting an annular waveguide.

The data reception antenna operates in a frequency band in the S band.

The biconical toroidal antenna is enclosed by an annular protective wall made from a dielectric material (for example, two KAPTON walls separated by a honeycomb structure) or any other material transparent to radio waves at the relevant frequency.

The data reception antenna has substantially the same diameter as the picture transmission antenna and is adjacent thereto.

The set of antennas further constitute an annular antenna for which spin stabilization is electronically compensated and includes feed and switching electronic means mounted under a peripheral part of an upper platform constituting the NORTH or SOUTH face of the satellite on which the set of antennas is mounted. The annular antenna operates at a frequency in the L band, and is disposed axially beyond the picture transmission antenna relative to the satellite body.

The annular antenna is surrounded by an antenna in the form of a plurality of crossed dipoles which operates in the UHF band.

The set of antennas further comprises an annular microstrip array control signal transmission antenna which operates in the S band and is disposed at one axial end of the set of antennas.

A third equipment which constitutes an infra-red sensor observation optical instrument includes a radiator. The apogee maneuver system is an annular plurality of at least two identical apogee thrusters equi-angularly distributed around the spin rotation axis on the face of the satellite opposite the set of antennas, the second radiator radiating from the opposite face within the annular plurality of thrusters. Two thrusters are disposed symmetrically on opposite sides of the spin rotation axis and in one embodiment are offset from the spin rotation axis by a distance which is at least half the radius of the cylindrical solar generator.

In an alternate embodiment the thrusters are offset from the spin rotation axis by a distance which is at least two-thirds the radius of the cylindrical solar generator.

It will be understood that the invention makes it necessary to dispense with the boom structure previously used for at least some of the antennas required for various essential ground communication roles (in particular transmission of pictures), and to develop toroidal antennas for these roles.

A toroidal configuration has provided an effective solution to the apparently insoluble problem which arises in the case of a boom type picture transmission antenna with axial transmission slots of achieving reliable communication with the ground in a frequency band that is very much wider than that of first generation satellites, namely the X or Ku band (respectively around 7.5 GHz and 18 GHz), despite atmospheric attenuation which increases with frequency and without having to increase significantly the electrical power generation capability of the satellite (related to the size of the solar generator). A biconical toroidal antenna provides better focusing of the transmitted beam, especially if it is in the immediate proximity of the satellite body.

Additionally, the invention proposes to dispose the switching and feed arrangements for the various antennas under the periphery of the satellite platform constituting the face of the satellite carrying the set of antennas, which has been found to enable highly effective evacuation towards deep space (through this platform) of heat generated when the antennas are operated, so minimizing disturbances to the process of keeping the sensors of the optical observation instrument at a low temperature.

The invention can advantageously be combined with a separate invention which proposes to substitute for the single apogee thruster an annular plurality of at least two thrusters disposed symmetrically around the axis of one face of the satellite, which makes it possible to mount on the spin rotation axis on the same face of the satellite the radiator of a second infra-red observation optical instrument such as a known sensor which characterizes the layers of the atmosphere, in particular in terms of pressure, temperature and relative humidity.

Objects, characteristics and advantages of the invention will emerge from the following description given by way of non-limiting example only with reference to the appended diagrammatic drawings.

BRIEF DESCRIPTION OF THE DRAWINGS

FIG. 9 is a partially cut away axial schematic view of the optical observation system as seen in the direction of the arrow IX in FIG. 10;

FIG. 10 is an analogous view of the optical observation system as seen in the direction of the arrow X in FIG. 9;

FIG. 13 is a partially cut away axial view in the direction of the arrow XIII in FIG. 14 of another satellite in accordance with the invention, inside the payload space available in an ARIANE type launch vehicle and equipped with a second infra-red sensor observation instrument;

FIG. 14 is another axial view of the satellite of FIG. 13 as seen in the direction of the arrow XIV in FIG. 13;

FIG. 15 is a perspective view of the satellite of FIGS. 13 and 14;

DETAILED DESCRIPTION OF THE PREFERRED EMBODIMENT

Figure 1:
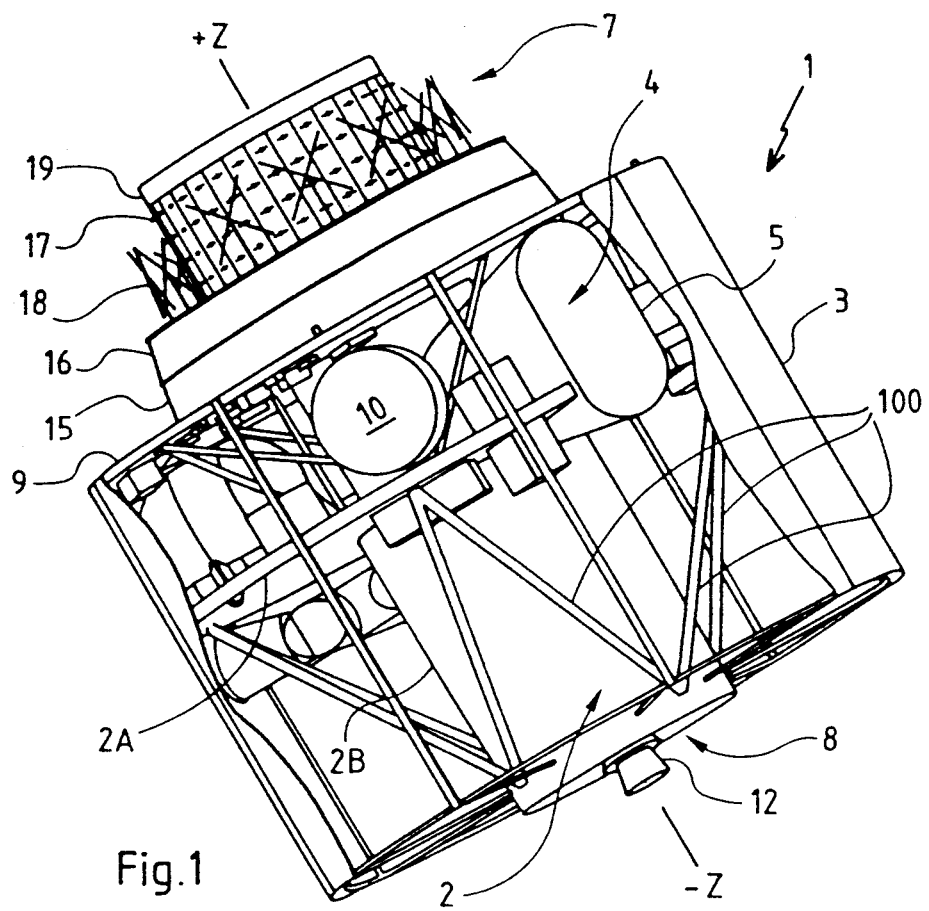
FIG. 1 is a partially cut away perspective view of a satellite in accordance with the invention.
Figure 2:
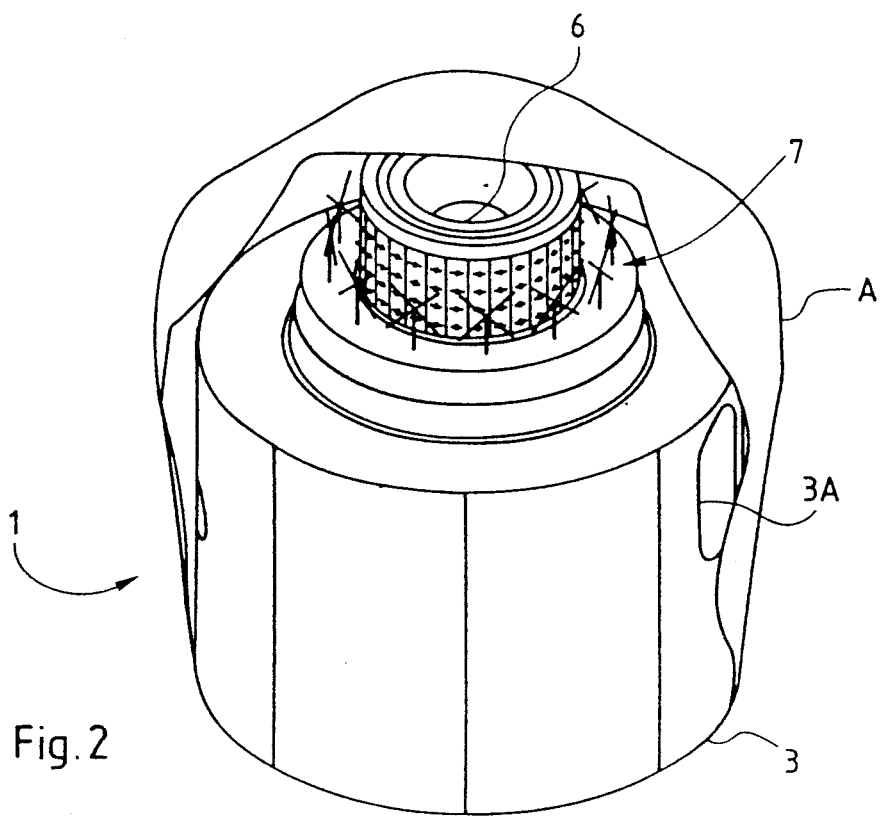
FIG. 2 is another perspective view of the satellite as seen from the side and from above, within the payload space available in an ARIANE type launch vehicle.
Figure 3:
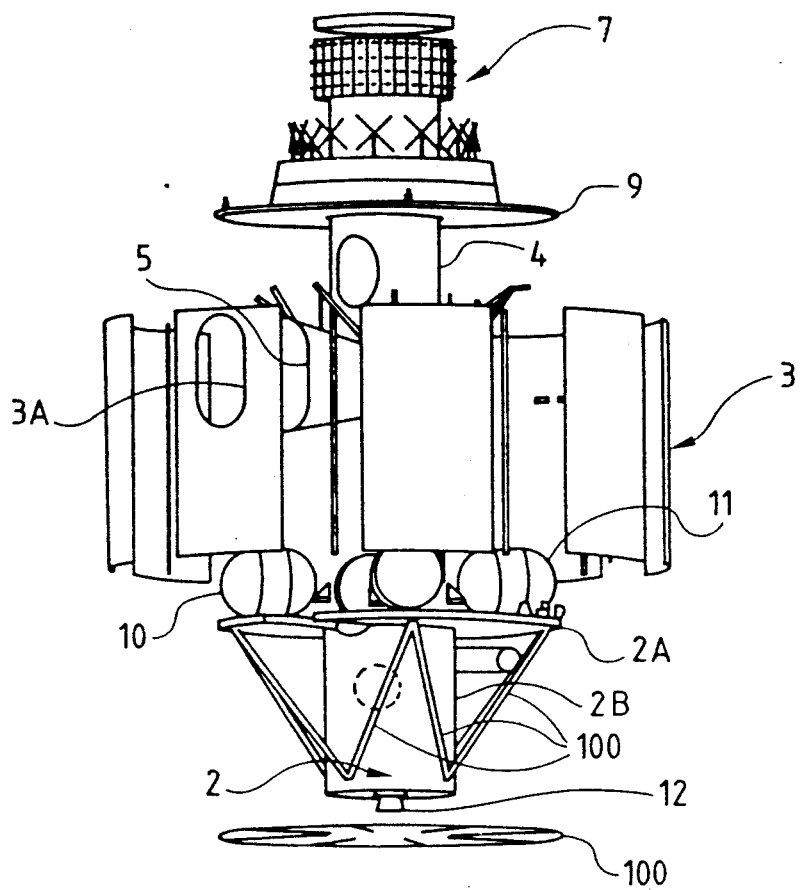
FIG. 3 is an exploded perspective view of the satellite.

FIGS. 1 through 3 show an observation satellite 1 designed to spin-stabilized about an axis ($-Z$, $+Z$) in a geostationary orbit.

In FIG. 2, the satellite is shown inside an outline A representing the space available for it in an ARIANE type double payload and launch structure.

The satellite has a body 2 surrounded by a cylindrical envelope 3 covered with solar cells and constituting a solar generator, an infra-red optical observation system 4 with a radial input baffle 5 and a radiator 6 disposed on a NORTH transverse face of the body, a set of telecommunication and picture transmission antennas 7 projecting from the same NORTH transverse face, and an axially disposed apogee propulsion system 8 discharging towards the SOUTH.

Referring to FIGS. 1 and 3, the satellite body 2 or service module conventionally includes a main platform 2A disposed transversely and a center tube 2B disposed axially and fastened to the platform.

Figure 11:
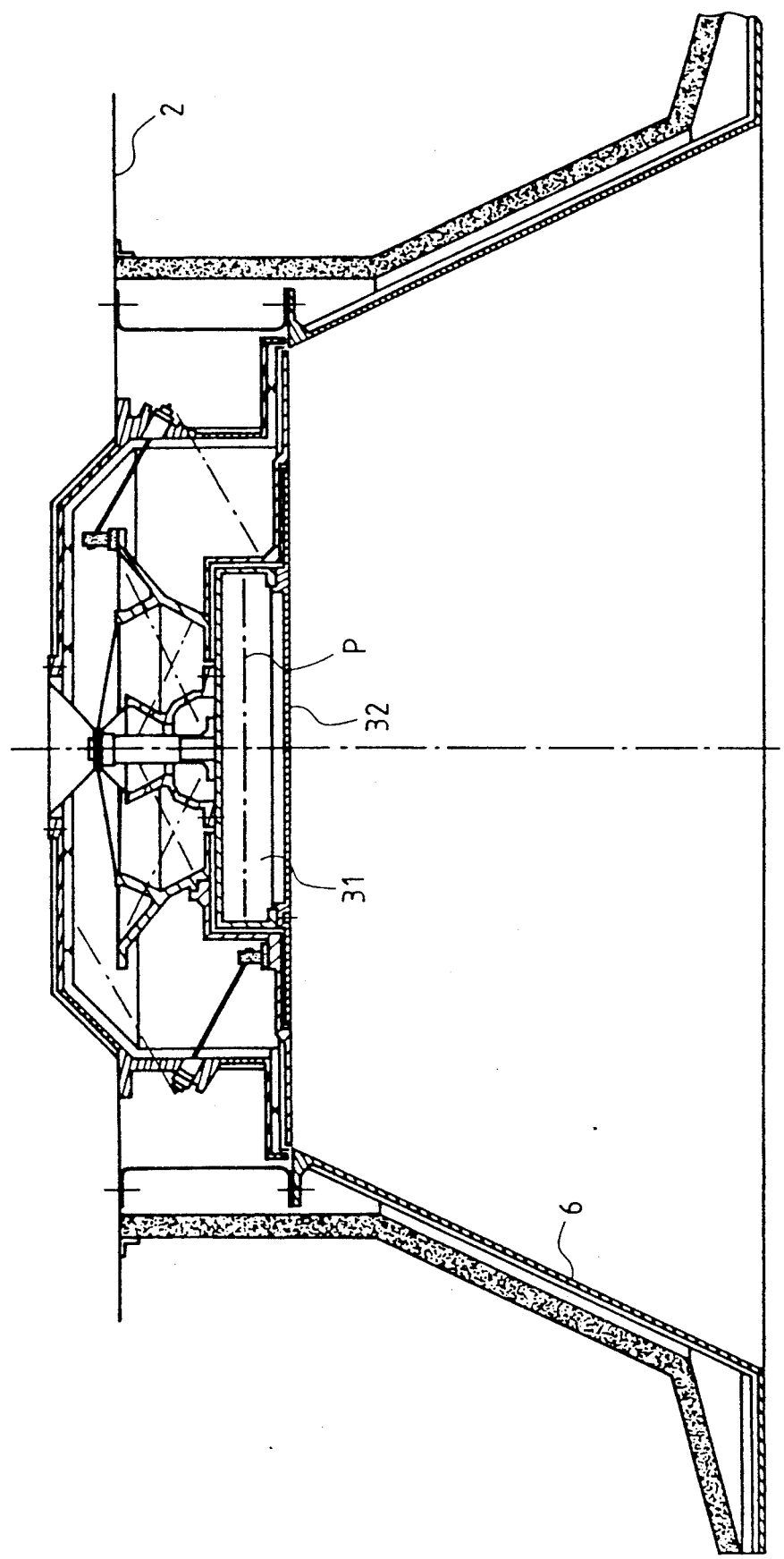
FIG. 11 is a view in axial cross-section of the radiator of the observation system.

The observation system 4 shown in more detail in FIGS. 9 through 11 is fastened to the top part of the center tube 2B, the baffle 5 passing through the center tube and being disposed facing an opening 3A formed in the solar generator. The upper part of the satellite body 2 is closed by an upper platform 9 to which is attached the set of antennas 7 shown in more detail in FIGS. 4 through 7.

The platform and the antennas constitute a telecommunication and picture transmission module.

The set of antennas is hollow, being disposed in a ring on the NORTH face of the satellite; at the center of this ring is a cylindrical space 14 (see FIG. 4) through which the radiator 6 can pass.

The electronics associated with the various antennas, in particular the switching and feed systems, including repeaters 7A, etc.) are mounted under the periphery of the platform 9 which achieves good evacuation towards deep space of heat generated in the electronics without disturbing the thermal environment of the radiator 6.

In this example the module composed of the set of antennas 7 plus the platform 9 has five antennas 15 through 19 each having a transmit or receive role.

The biconical toroidal antenna 15 is installed around the annular platform 9. It has two frustoconical walls 15A and 15B which diverge away from an annular source 15C in the form of a large diameter waveguide (see FIG. 6); this waveguide has four sectors at 90° separated by short-circuit areas 15D and fed in parallel from a power splitter 15E.

This antenna is adapted to transmit unprocessed images to processing stations on Earth. In this example this transmission is at a microwave frequency in the Ku band (18 GHz, for example).

Figure 7:
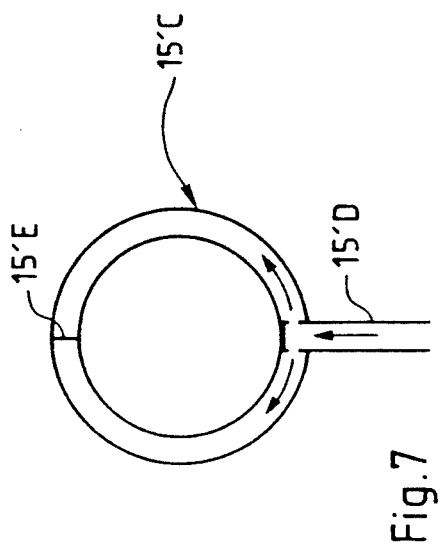
FIG. 7 shows the electrical feed circuit for the same biconical antenna of the FIG. 5 stack where the latter operates in the X band.
Figure 6:
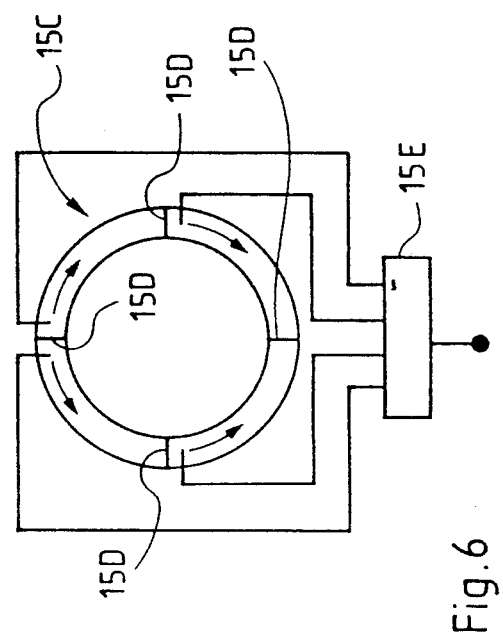
FIG. 6 shows the electrical feed circuit associated with a first biconical antenna of the FIG. 5 stack where the latter operates in the Ku band.

FIG. 7 shows an alternative embodiment of the annular source 15'C suitable for X band frequencies (7.5 GHz, for example). It has an inlet waveguide 15'D and a cut-off/short-circuit area 15'E.

The angular amplitude of the beam from the antenna 15 is defined by the walls 15A and 15B. To enable optimum focusing towards the area on the ground containing the receiving Earth stations, the walls 15A and 15B can be inclined differently to the axis. In this example the beam angle is approximately 7°, offset towards the NORTH to provide selective coverage of Europe (European satellite).

In an alternative embodiment (not shown) the annular antenna may use microstrip array antenna technology.

The antenna 15 is protected by a wall 15F transparent to the transmitted radiation, made from carbon, for example.

The antenna 16 is also biconical, delimited by frustoconical walls 16A and 16B, in this case with the same cone angle. They diverge away from an annular source 16C which can be similar to that of FIG. 7, for example. It is also protected by an annular wall 16F of carbon, for example.

The antenna 16 is designed to receive data (for subsequent retransmission) transmitted by an Earth station and representing a processed version of the unprocessed images transmitted by the antenna 15 and auxiliary data.

This antenna operates in the S band of frequencies (around 2.1 GHz) and the angular amplitude of the beam is 20°.

The antenna 17 is designed to retransmit to Earth stations the processed images received from the antenna 16. Except for the location of the associated electronics (see above), it is of the type known in itself for a similar function in first generation satellites. It is electronically "despinned", which means that the spin rotation is compensated by electronic means.

It operates in the L band of frequencies (around 1.69 GHz), typically with a beam angle of 20°.

Around the antenna 17 is disposed a plurality of crossed dipoles 18A constituting the antenna 18 which is adapted to operate in the UHF band (at around 402 MHz, for example) and is designed to receive data transmitted by meterological beacons on Earth.

The microstrip array antenna 19 is axially aligned with the antenna 17. It operates in the S band (around 2.1 GHz) and exchanges signals (telecontrol, telemetry, etc.) with a control station on Earth. Its angle is typically 80°.

Figure 5:
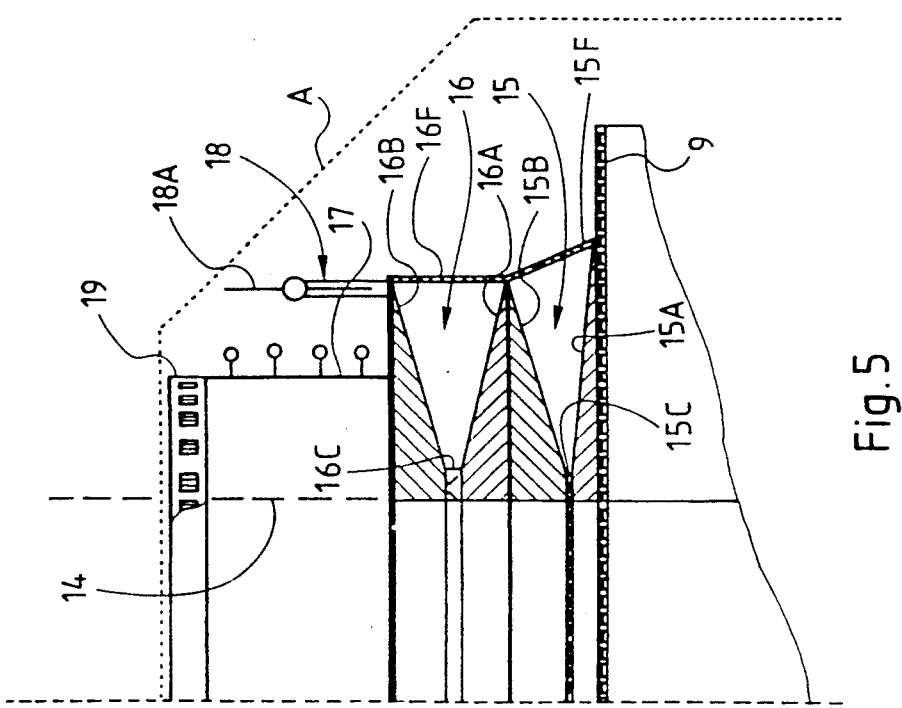
FIG. 5 is a partial, elevational view of the stacked antennas of the module of FIG. 4.

The stacked arrangment of the antennas shown in FIG. 5 is preferred, but may be varied.

It has been found that the concentric arrangement of the antennas 17 and 18 does not lead to any interference.

It is preferable to dispose the antenna 19 at the end of the stack as this makes it easier to achieve a large transmission angle.

It is advisable to place the antenna 15 near the platform 9 as reflection from the NORTH face (i.e. from this platform) is not critical.

To give a numerical example, for a solar generator diameter of 3.2 m the protective walls 15F and 16F have a diameter of 2 m and the antennas 17 and 19 have a diameter of 1.3 m, the central cylindrical opening has a diameter of around 1 m matching the outside diameter of the observation module 4.

Figure 8:
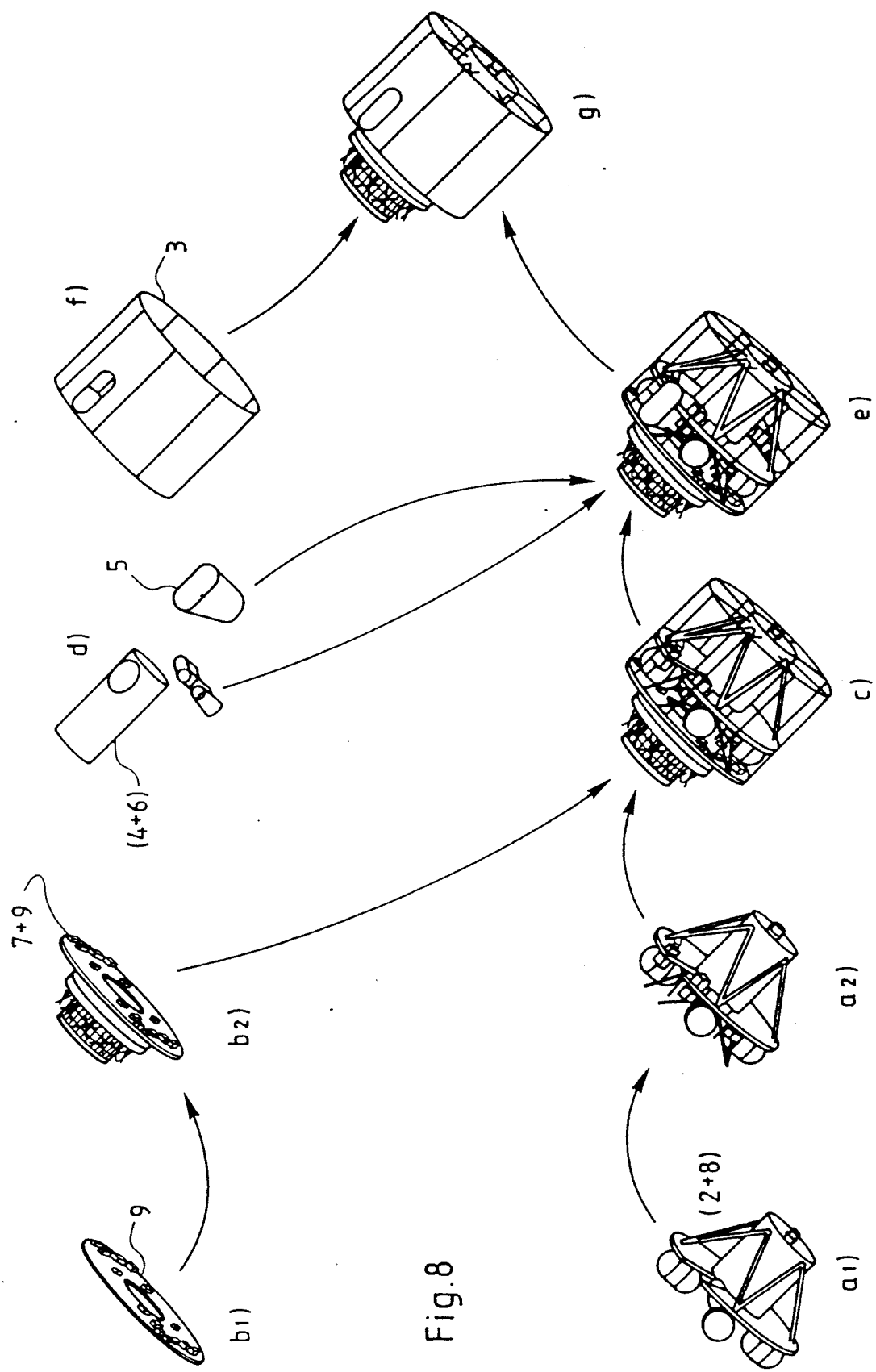
FIG. 8 is a diagram showing various stages in the assembly of the satellite.

Referring to FIG. 8, the satellite 1 is designed for modular integration:
construction of the service and combustion module 2+8 ($a_1$ and $a_2$) is parallel with construction of the antenna module 7+9 ($b_1$ and $b_2$),
integration of the modules 2+8 and 7+9 (c),
assembly of the observation module 4+5+6 (d),
integration of the modules 4+5+6 and 2+8 and 7+9 (e),
assembly of the solar generator module (f) and integration of the assembled solar generator module (g).

It will be understood that the order of module integration steps d and f can be interchanged.

The apogee propulsion system 8 is disposed around the center tube 2B (FIG. 3). The system is a liquid propellant feed system, which is conventional in itself, connected to attitude control and orbit correction thrusters of any appropriate known type (not shown).

The propulsion system 8 includes propellant tanks 10 and 11 held in place in the satellite body by various stiffener and fixing cross members of any appropriate known type, some of which are shown in FIGS. 1 and 3 with the reference number 100, and a central conventional apogee thruster 12 (in practice with a thrust of 400N).

The observation system 4 is conventional and is shown for information only in FIGS. 9 through 11.

The observation system essentially is a mirror 30 which reflects an incident ray S parallel to the axis onto a focusing plane P (FIGS. 9 through 11) situated in a housing 31 containing any appropriate known type infra-red sensors along a transverse radiative surface 32 coated with a white paint in the known way and appropriately surrounded by a frustoconical radiator 6.

Figure 12:
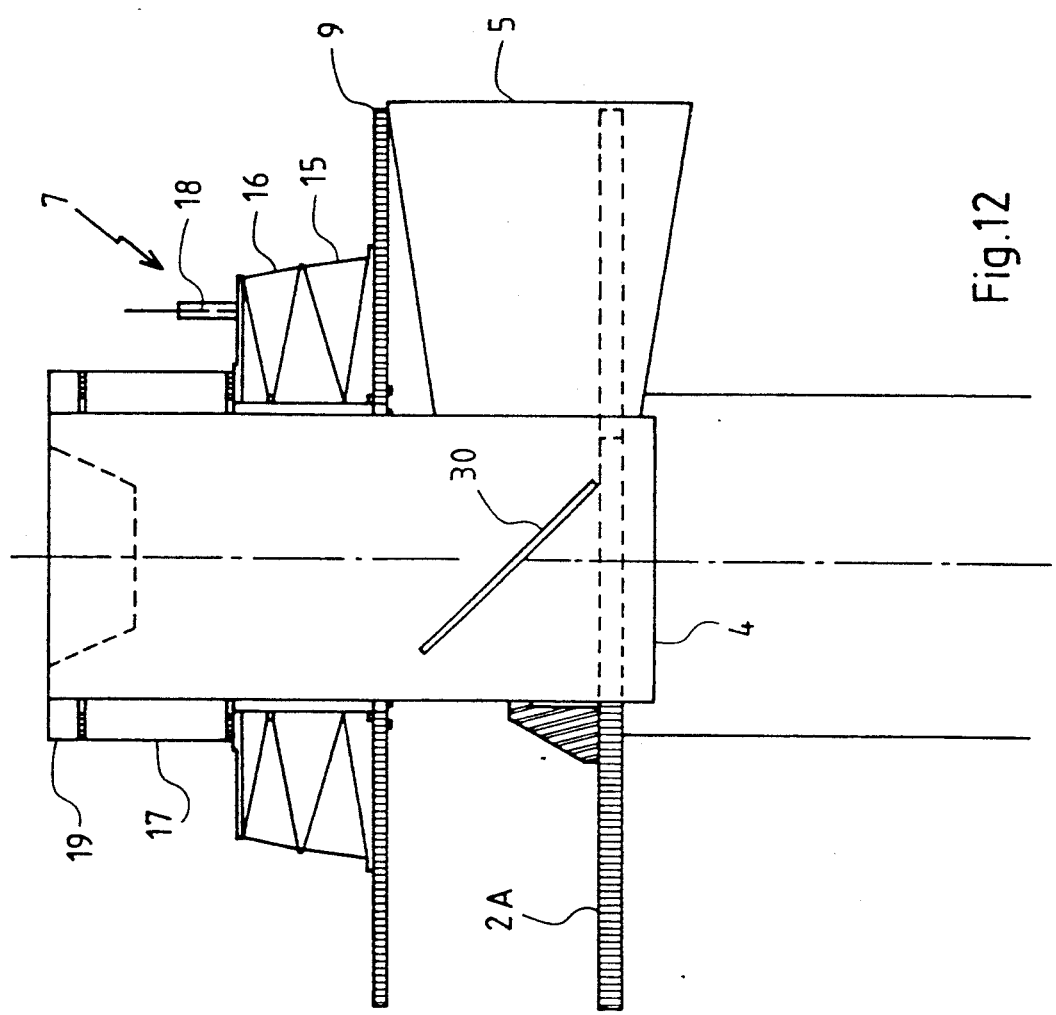
FIG. 12 is a view in axial cross-section of the optical observation system installed inside the hollow antenna stack.

FIG. 12 shows the relative position of the observation module in the satellite body.

FIGS. 13 through 16 show an alternative embodiment of a satellite 101 in accordance with the invention which differs from the satellite 1 in the previous figures by virtue of the existence of a second infra-red sensor optical observation system.

In FIGS. 13 and 14 the satellite 101 is shown within an envelope A'.

The satellite 101 includes many parts similar to those of the satellite 1 and similar reference numbers have been used in FIGS. 13 through 16, either "primed" in the case of overall structural members or increased by 100 in the case of the liquid propellant system.

Figure 16:
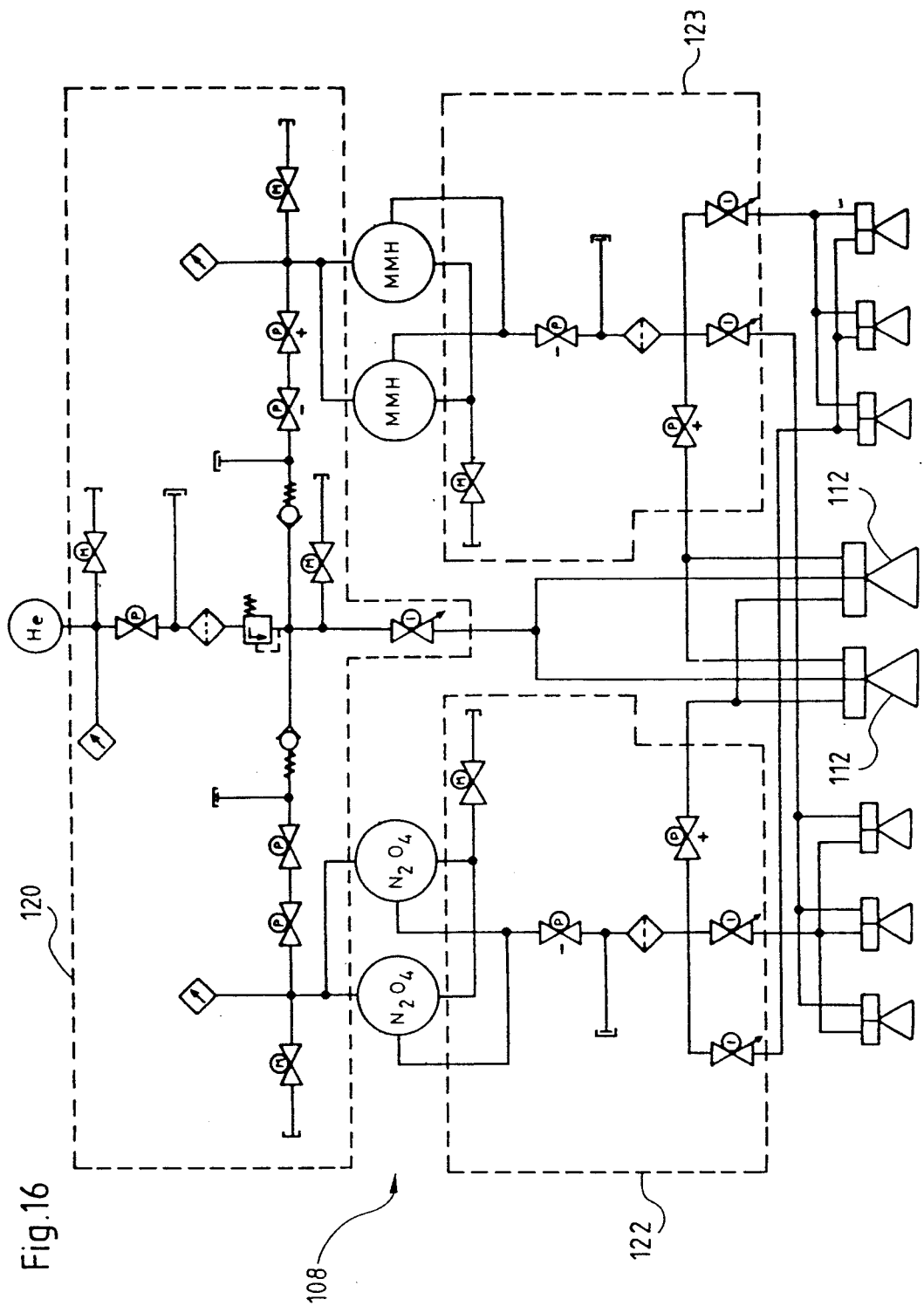
FIG. 16 is a diagram showing the unified propulsion system for the satellite of FIGS. 13 to 15.

Referring to FIG. 16, this system conventionally includes a pressurization stage 120 and two feed stages 122 and 123 each specific to one propellant.

To enable a radiator 106 which is part of a second observation instrument 104 to be mounted, the single thruster of the satellite 1 of the previously described embodiment has been replaced with an annular plurality of identical thrusters 112 disposed on the SOUTH face of the satellite in such a way as to leave a central space for the radiator 106. These thrusters are offset from the axis by a distance of at least half and up to two thirds the radius of the solar generator 3'.

The satellite 101, therefore, incorporates two solutions to the technical problem at which the invention is directed.

Figure 4:
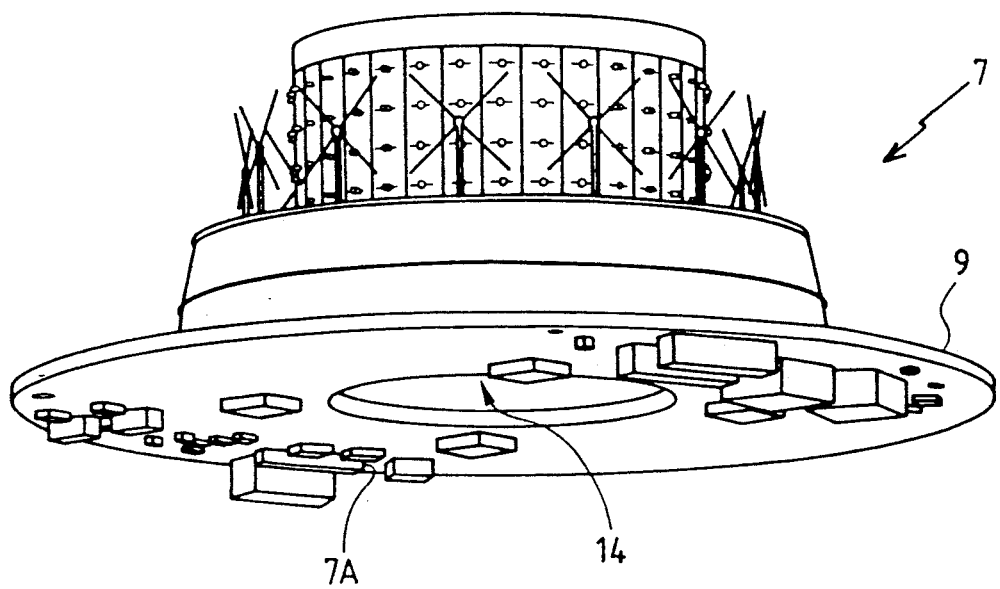
FIG. 4 is a perspective view of the telecommunication module of the satellite.
Figure 17:
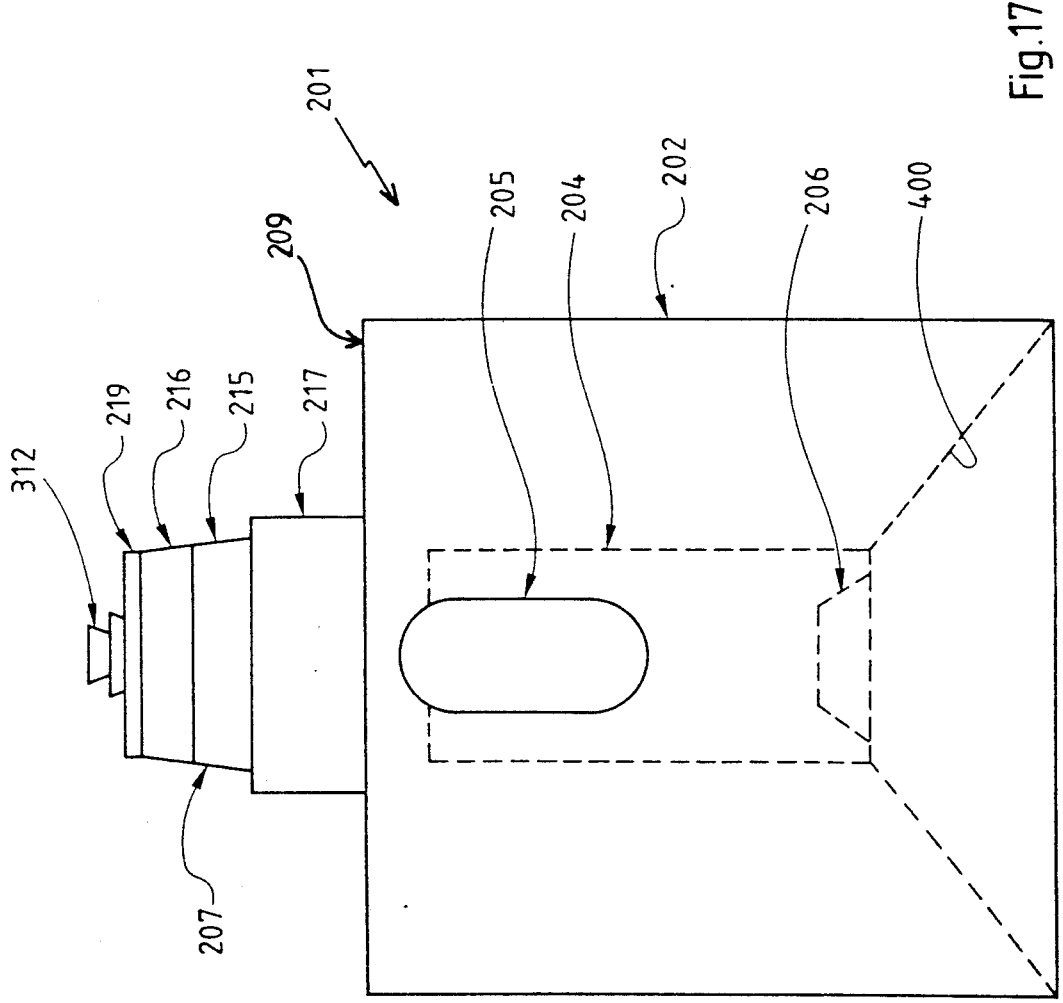
FIG. 17 is a view in elevation of a third satellite in accordance with the invention whose apogee thruster is mounted on the same face of the satellite as the set of antennas.

FIG. 17 shows a third satellite 201 including a hollow stack of antennas similar to that of FIGS. 4 and 5, an apogee thruster and the radiator of an observation instrument. However, in this case the apogee thruster 312 is housed inside the antenna stack 207 and the radiator 206 is on the opposite side. In practice the radiator discharges outside the stack of antennas.

The reference number 204 designates the general outline of the observation system within the satellite body 202 and the reference number 205 designates the input baffle of this system.

The radiator 206 of this observation system is surrounded by a frustoconical skirt 400 attached to the body 202, its cone angle and axial dimension being such as to prevent any penetration of solar radiation as far as the radiator (even at solstices, the winter solstice in this case); the skirt is made from a highly polished reflective material, typically aluminum.

The particular shape of the satellite, with the skirt 400, is made possible by the compact design of the set of antennas 207 which is significantly shorter (parallel to the spin rotation axis) than the S band telecommunication booms used on first generation satellites.

This configuration makes it possible to reduce the temperature of the focal plane to below 90K. This configuration, therefore, makes it possible to optimize the quality of observations in the infra-red band.

In FIG. 17 the stack of antennas 207 is, starting from the NORTH transverse surface 209 of the satellite: an S band antenna 217 similar to the FIG. 5 antenna 17 and surrounded by an antenna (not shown) similar to the antenna 18, an (X band or Ku band) antenna 215, an (S band) antenna 216 and an (S band) antenna 219 similar to the antennas 15, 16 and 19.

It goes without saying that the foregoing description has been given by way of non-limiting example only and that numerous modifications will suggest themselves to those skilled in the art without departing from the scope of the invention.

In particular, the toroidal antennas 15 and 16 may be implemented in microstrip array technology as described with reference to the antenna 19.

What is claimed is:

1. An observation satellite adapted to be spin-stabilized in geostationary orbit for carrying at least two equipments, said observation satellite comprising:
a satellite body having a spin rotation axis, said satellite body having a pair of axially displaced faces transversely oriented to said spin rotation axis, a first of said axially displaced faces being a NORTH face and a second of said axially displaced faces being an oppositely disposed SOUTH face;

a solar generator disposed circumferentially around said satellite body;

a liquid propellant apogee maneuver system disposed along said spin rotation axis adjoining one of said first and second axially displaced faces; and a set of antennas including at least a picture transmission antenna, said set of antennas being disposed annularly about said spin rotation axis on one of said first and second axially displaced faces of said observation satellite, said set of annular antennas defining a cylindrical space coaxial with said spin rotation axis, said cylindrical space being adapted to receive one of said at least two equipments.

2. An observation satellite according to claim 1 wherein said one of said axially displaced faces is disposed toward deep space, and wherein said observation satellite further comprises an observation system radiator mounted on said one of said axially displaced faces and further disposed within said defined cylindrical space.

3. An observation satellite according to claim 1 wherein said apogee maneuver system further comprises an apogee thruster disposed within said cylindrical space.

4. An observation satellite according to claim 3 further comprising an observation system radiator mounted to the other of said first and second axially displaced faces opposite said set of antennas and said apogee thruster, said observation system radiator being circumscribed by an axial skirt fastened to said satellite body.

5. An observation satellite according to claim 1 wherein said picture transmission antenna is a biconical toroidal antenna having an annular source circumscribing said cylindrical space, said biconical toroidal antenna being in the form of a waveguide.

6. An observation satellite according to claim 5 wherein said picture transmission antenna has a pair of walls defining an asymmetric aperture angle, said asymmetric aperture angle being asymmetric relative to a plane transverse to said spin rotation axis.

7. An observation satellite according to claim 5, wherein said picture transmission antenna operates in a frequency band in the X or Ku band.

8. An observation satellite according to claim 1 wherein said picture transmission antenna is disposed adjacent said one of said axially displaced faces of said observation satellite and adjacent said set of antennas.

9. An observation satellite according to claim 1 wherein said set of antennas further comprises a biconical toroidal data reception antenna having an annular waveguide.

10. An observation satellite according to claim 9 wherein said biconical toroidal data reception antenna operates in a frequency band in the S band.

11. An observation satellite according to claim 5 wherein said biconical toroidal antenna is enclosed by an annular protective wall.

12. An observation satellite according to claim 11 wherein said annular protective wall is made from a dielectric material.

13. An observation satellite according to claim 9 wherein said biconical toroidal data reception antenna has a diameter which is substantially equal to a diameter of said picture transmission antenna and wherein said biconical toroidal data reception antenna is adjacent said picture transmission antenna.

14. An observation satellite according to claim 1 wherein said set of antennas further comprises an annular antenna disposed at said one of said axially displaced faces, said annular antenna having spin stabilization which is electronically compensated, and wherein said one of said axially displaced faces has an upper platform, said observation satellite further comprising feed and switching electronic means mounted under a peripheral part of said upper platform.

15. An observation satellite according to claim 14 wherein said annular antenna operates at a frequency in the L band.

16. An observation satellite according to claim 14 wherein said annular antenna is disposed axially beyond said picture transmission antenna relative to said satellite body.

17. An observation satellite according to claim 14 wherein said annular antenna is surrounded by another annular antenna, said antenna comprising a plurality of crossed dipoles.

18. An observation satellite according to claim 17 wherein said antenna operates in the UHF band.

19. An observation satellite according to claim 1 wherein said set of antennas further comprises an annular microstrip array control signal transmission antenna.

20. An observation satellite according to claim 19 wherein said annular microstrip array control signal transmission antenna operates in the S band.

21. An observation satellite according to claim 19 wherein said annular microstrip array control signal transmission antenna is disposed at one axial end of said set of antennas.

22. An observation satellite according to claim 1 further comprising an infra-red sensor observation optical instrument disposed at an opposite one of said axially displaced faces, said infra-red sensor observation optical instrument having a second radiator, and wherein said apogee maneuver system comprises an annular plurality of at least two identical apogee thrusters equi-angularly distributed around said spin rotation axis on said opposite one of said axially displaced faces opposite said set of antennas, said second radiator radiating from said opposite one of said axially displaced faces within said annular plurality of at least two identical apogee thrusters.

23. An observation satellite according to claim 22 comprising two thrusters disposed symmetrically on opposite sides of said spin rotation axis.

24. An observation satellite according to claim 22 wherein said annular plurality of at least two identical apogee thrusters are offset from said spin rotation axis by a distance which is at least half of a radius of said solar generator.

25. An observation satellite according to claim 24 wherein said annular plurality of at least two identical apogee thrusters are offset from said spin rotation axis by a distance which is at least two-thirds of a radius of said solar generator.

26. An observation satellite according to claim 9 wherein said biconical toroidal data reception antenna is enclosed by an annular protective wall.

27. An observation satellite according to claim 13 wherein said picture transmission antenna is disposed adjacent said one of said axially displaced faces of said satellite on which said set of antennas is mounted.

28. An observation satellite according to claim 27 wherein said set of antennas further comprises an annular antenna disposed at said one of said axially displaced faces, said annular antenna having spin stabilization which is electronically compensated, and wherein said one of said axially displaced faces has an upper platform, said observation satellite further comprising feed and switching electronic means mounted under a peripheral part of said upper platform.

29. An observation satellite according to claim 28 wherein said annular antenna operates at a frequency in the L band.

30. An observation satellite according to claim 28 wherein said annular antenna is surrounded by an antenna, said antenna comprising a plurality of crossed dipoles.

31. An observation satellite according to claim 30 wherein said antenna operates in the UHF band.

32. An observation satellite according to claim 30 wherein said set of antennas further comprises an annular microstrip array control signal transmission antenna.

33. An observation satellite according to claim 32 wherein said annular microstrip array control signal transmission antenna operates in the S band.

34. An observation satellite according to claim 32 wherein said annular microstrip array control signal transmission antenna is disposed at one axial end of said set of antennas.

35. An observation satellite adapted to be spin-stabilized in geostationary orbit for carrying at least two equipments, said observation satellite comprising:
- a satellite body having a spin rotation axis, said satellite body having a pair of axially displaced faces transversely oriented to said spin rotation axis, a first of said axially displaced faces being a NORTH face and a second of said axially displaced faces being an oppositely disposed SOUTH face, one of said first and second displaced faces further comprising an upper platform spaced a predetermined axial distance from said satellite body;
- a solar generator disposed circumferentially around said satellite body;
- a liquid propellant apogee maneuver system disposed along said spin rotation axis adjoining one of said first and second axially displaced faces;
- a set of antennas disposed annularly about said spin rotation axis on said one of said first and second axially displaced faces having said upper platform thereon, said set of antennas defining a cylindrical space coaxial with said spin rotation axis, said cylindrical space adapted to receive at least one of said two equipments, said set of antennas further comprising:
    - a picture transmission antenna mounted to said upper platform, said picture transmission antenna being a biconical toroidal antenna having an annular source circumscribing said cylindrical space, said biconical toroidal antenna being in the form of a waveguide;
    - a biconical toroidal data reception antenna contiguous said picture transmission antenna, said biconical toroidal data reception antenna having an annular waveguide; and
- means for spin stabilizing said set of antennas, said spin stabilizing means being electronically compensated; and
- a feed and switching electronic means mounted to said upper platform.

* * * * *